US010769300B2

(12) United States Patent
Greene et al.

(10) Patent No.: US 10,769,300 B2
(45) Date of Patent: *Sep. 8, 2020

(54) DATA PROCESSING IN A HYBRID CLUSTER ENVIRONMENT

(71) Applicant: International Business Machines Corporation, Armonk, NY (US)

(72) Inventors: Lawrence A. Greene, Plainville, MA (US); Yong Li, Newton, MA (US); Ryan Pham, San Jose, CA (US); Xiaoyan Pu, Chelmsford, MA (US); Yeh-Heng Sheng, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,908

(22) Filed: Jun. 26, 2019

(65) Prior Publication Data

US 2019/0318123 A1  Oct. 17, 2019

Related U.S. Application Data

(63) Continuation of application No. 15/915,428, filed on Mar. 8, 2018.

(51) Int. Cl.
*H01L 29/06* (2006.01)
*G06F 21/62* (2013.01)
(Continued)

(52) U.S. Cl.
CPC ........ *G06F 21/6245* (2013.01); *G06F 9/4881* (2013.01); *G06F 9/5083* (2013.01);
(Continued)

(58) Field of Classification Search
CPC .................................................. G06F 21/6245
See application file for complete search history.

(56) References Cited

U.S. PATENT DOCUMENTS 8,589,885 B2 * 11/2013 Maybee ............... G06F 11/362
717/124
9,009,697 B2 * 4/2015 Breiter ................. G06F 9/5072
717/120
(Continued)

OTHER PUBLICATIONS

Mell, P. and T. Grance, "Effectively and Securely Using the Cloud Computing Paradigm", [online], Oct. 7, 2009, retrieved from the Internet at URL: http://csrc.nist.gov/groups/SNS/cloud-computing/cloud-computing-v26.ppt>, Total 80 pp.
(Continued)

*Primary Examiner* — Harris C Wang
(74) *Attorney, Agent, or Firm* — Konrad Raynes Davda & Victor LLP; Janaki K. Davda

(57) ABSTRACT

A hybrid cluster environment with a public cloud cluster having nodes storing data and a plurality of private clusters is provided, wherein each of the plurality of private clusters has nodes storing data. Registration data that indicates a customer identifier, a new private cluster, and a file transfer server is received. The new private cluster is added to the plurality of private clusters in the hybrid cluster environment. Input to design a job to process data in the hybrid cluster environment is received. It is determined that the job is to be deployed to the new private cluster. The job is deployed to the new private cluster using the file transfer server, wherein the job is executed at the new private cluster. Job status information and one or more job logs are received with the file transfer server.

7 Claims, 11 Drawing Sheets

(51) Int. Cl.
  *G06F 9/48* (2006.01)
  *H04L 29/08* (2006.01)
  *G06F 9/50* (2006.01)
  *G06F 16/182* (2019.01)

(52) U.S. Cl.
  CPC .......... *G06F 16/183* (2019.01); *H04L 67/06* (2013.01); *H04L 67/1002* (2013.01)

(56) References Cited

U.S. PATENT DOCUMENTS

| | | | | |
|---|---|---|---|---|
| 9,053,580 | B2* | 6/2015 | Adam | G06T 11/206 |
| 10,075,519 | B2* | 9/2018 | Jimenez | H04L 67/1051 |
| 10,362,109 | B2* | 7/2019 | Merchant | H04L 67/10 |
| 2011/0016214 | A1* | 1/2011 | Jackson | G06F 9/505 |
| | | | | 709/226 |
| 2012/0066670 | A1* | 3/2012 | McCarthy | G06F 9/5072 |
| | | | | 717/169 |
| 2012/0209901 | A1* | 8/2012 | Xu | H04L 67/32 |
| | | | | 709/201 |
| 2013/0159380 | A1* | 6/2013 | Alam | H04L 41/0806 |
| | | | | 709/203 |
| 2013/0262556 | A1* | 10/2013 | Xu | G06F 9/5027 |
| | | | | 709/202 |
| 2013/0339935 | A1 | 12/2013 | Melamed | |
| 2014/0006342 | A1* | 1/2014 | Love | G06F 16/23 |
| | | | | 707/609 |
| 2014/0101226 | A1* | 4/2014 | Khandekar | H04L 67/1031 |
| | | | | 709/203 |
| 2015/0019689 | A1* | 1/2015 | Singh | H04L 67/1023 |
| | | | | 709/219 |
| 2015/0089626 | A1* | 3/2015 | Korangy | H04L 63/02 |
| | | | | 726/12 |
| 2015/0229586 | A1* | 8/2015 | Jackson | G06Q 30/0269 |
| | | | | 705/40 |
| 2015/0301839 | A1* | 10/2015 | Bansal | G06F 9/44505 |
| | | | | 709/222 |
| 2016/0047940 | A1 | 2/2016 | Owen et al. | |
| 2016/0048408 | A1* | 2/2016 | Madhu | G06F 11/2056 |
| | | | | 718/1 |
| 2016/0057073 | A1 | 2/2016 | Steinder et al. | |
| 2016/0092558 | A1* | 3/2016 | Ago | G06F 16/328 |
| | | | | 707/737 |
| 2016/0105311 | A1 | 4/2016 | Thakkar et al. | |
| 2016/0105488 | A1 | 4/2016 | Thakkar et al. | |
| 2016/0125059 | A1 | 5/2016 | Jain et al. | |
| 2016/0134558 | A1 | 5/2016 | Steinder et al. | |
| 2016/0188359 | A1 | 6/2016 | Chang et al. | |
| 2016/0197841 | A1 | 7/2016 | Xu et al. | |
| 2016/0323142 | A1* | 11/2016 | Mani | G06F 16/907 |
| 2018/0159929 | A1* | 6/2018 | Heckle | H04L 67/2814 |
| 2019/0235901 | A1* | 8/2019 | Aiyar | G06F 9/45558 |
| 2019/0278938 | A1* | 9/2019 | Greene | G06F 9/5072 |

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

Shah, H., "On-Premises and Cloud Hybrid Hadoop Data Pipelines with Hortonworks and Cortana Analytics", [online], [Retrieved on Feb. 26, 2018], posted on Feb. 1, 2016. Retrieved from the Internet at <URL: https://azure.microsoft.com/en-us/blog/on-premises-and-cloud-hybrid-hadoop-data-pipelines-with-hortonworks-and-cortana-analytics/>, Total 5 pp.

List of IBM Patents or Patent Applications Treated as Related, dated Jun. 26, 2019, 2 pp. [57.403C1 (Appendix P)].

U.S. Appl. No. 15/915,428, filed Mar. 8, 2018, 3 pp. [57.403 (Appln)].

Preliminary Amendment for U.S. Appl. No. 15/915,428, filed Jun. 26, 2019, 5 pp. [57.403 (PrelimAmend)].

Notice of Allowance for U.S. Appl. No. 15/915,428, 20 pages, dated Apr. 28, 2020 [57A03 (NOA1)].

* cited by examiner

DATA PROCESSING IN A HYBRID CLUSTER ENVIRONMENT

FIELD

Embodiments of the invention relate to data processing in a hybrid cluster environment. The hybrid cluster environment includes one or more public cloud clusters and one or more private clusters.

BACKGROUND

More and more customers start to learn cluster computing technology, such as with an Apache® Spark® cluster, and leverage its power and ease of use with a consistent set of Application Programming Interfaces (APIs) to do batch, interactive, and stream data processing. (Apache and Spark are registered trademarks of the Apache Software Foundation in the United States and/or other countries.)

Data that is stored in a cluster at a customer site may be referred to as data in an on-premise cluster. That is, an on-premise cluster is typically at the customer's physical location. The processing of data may require transferring data from the customer site to a cloud cluster, performing processing, and returning the data to the customer site. However, in order to protect data going into and coming out from the cloud cluster, a secure gateway needs to be configured first to transfer data with proper security protection.

This approach causes multiple issues. For example, data transfer is inefficient when working with a large dataset to move that data to the cloud cluster, perform data processing on the data, then send the data back to the on-premise cluster. In addition, there is a potential security issue, and to mitigate the risk, some systems have introduced data masking technology to mask key columns of the data, such as Personal Identification Information (PII) (i.e., social security number), and this introduces computational complexity.

SUMMARY

In accordance with embodiments, a computer-implemented method is provided for data processing in a hybrid cluster environment. The computer-implemented method comprises: providing a hybrid cluster environment with a public cloud cluster having nodes storing data and a plurality of private clusters, wherein each of the plurality of private clusters has nodes storing data; receiving registration data that indicates a customer identifier, a new private cluster, and a file transfer server; adding the new private cluster to the plurality of private clusters in the hybrid cluster environment; receiving input to design a job to process data in the hybrid cluster environment; determining that the job is to be deployed to the new private cluster; deploying the job to the new private cluster using the file transfer server, wherein the job is executed at the new private cluster; and receiving job status information and one or more job logs with the file transfer server.

In accordance with other embodiments, a computer program product is provided for data processing in a hybrid cluster environment. The computer program product comprising a computer readable storage medium having program code embodied therewith, the program code executable by at least one processor to perform operations comprising: providing a hybrid cluster environment with a public cloud cluster having nodes storing data and a plurality of private clusters, wherein each of the plurality of private clusters has nodes storing data; receiving registration data that indicates a customer identifier, a new private cluster, and a file transfer server; adding the new private cluster to the plurality of private clusters in the hybrid cluster environment; receiving input to design a job to process data in the hybrid cluster environment; determining that the job is to be deployed to the new private cluster; deploying the job to the new private cluster using the file transfer server, wherein the job is executed at the new private cluster; and receiving job status information and one or more job logs with the file transfer server.

In yet other embodiments, a computer system is provided for data processing in a hybrid cluster environment. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: providing a hybrid cluster environment with a public cloud cluster having nodes storing data and a plurality of private clusters, wherein each of the plurality of private clusters has nodes storing data; receiving registration data that indicates a customer identifier, a new private cluster, and a file transfer server; adding the new private cluster to the plurality of private clusters in the hybrid cluster environment; receiving input to design a job to process data in the hybrid cluster environment; determining that the job is to be deployed to the new private cluster; deploying the job to the new private cluster using the file transfer server, wherein the job is executed at the new private cluster; and receiving job status information and one or more job logs with the file transfer server.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments advantageously move data processing to where the data resides, to gain the data locality and reduce the Input/Output (I/O) overhead of transferring the data, which improves computer processing.

Figure 1:
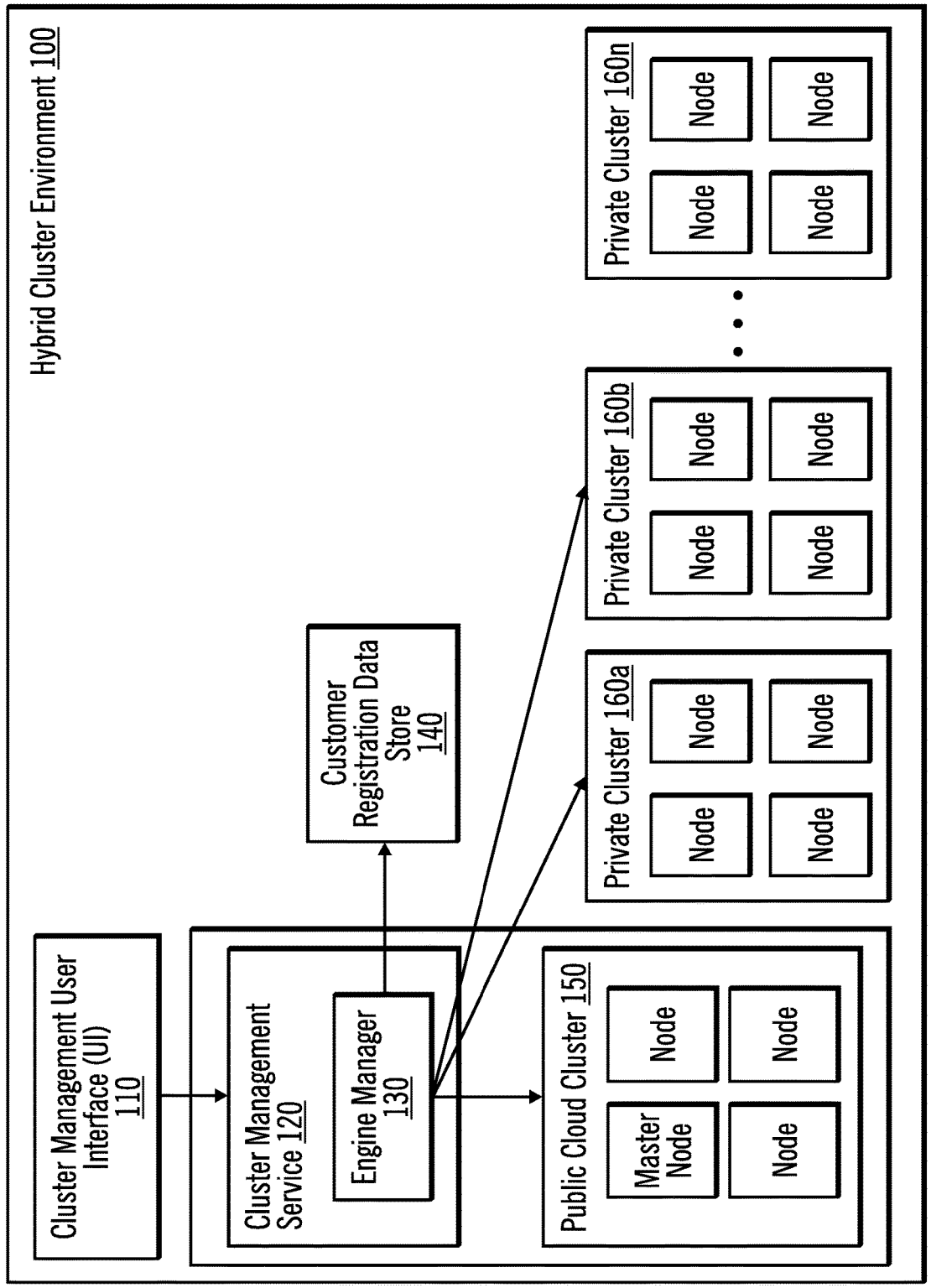
FIG. 1 illustrates, in a block diagram, a hybrid cluster environment in accordance with certain embodiments.

FIG. 1 illustrates, in a block diagram, a hybrid cluster environment 100 in accordance with certain embodiments. In the hybrid cluster environment 100, a cluster management User Interface (UI) 110 is coupled to a cluster management service 120. Although the cluster management UI 110 is illustrated separately from the cluster management service 120, with embodiments, the cluster management User Interface (UI) 110 is part of the cluster management service 120. The cluster management service 120 includes an engine manager 130. The engine manager 130 is coupled to a customer registration data store 140 to store data for customers. In certain embodiments, the customer registration data store 140 is a database.

The engine manager 130 is also coupled to a public cloud cluster 150 and to private clusters 160a . . . 160n. Although one public cloud cluster 150 is shown, there may be any number of public cloud clusters in various embodiments. Each of the clusters 150, 160a . . . 160n includes nodes. Although four nodes are shown for simplicity, each of the clusters 150, 160a . . . 160n may have any number of nodes. A node may be described as a server computer or virtual machine. The private clusters 160a . . . 160n may be used to store data for different customers. For example, data for customer A may be stored in private cluster 160a, while data for customer B may be stored in private cluster 160b. Each private cluster 160a . . . 160n may be a private cloud cluster (with nodes in a cloud infrastructure that are accessible to the client) or an on-premise cluster (at the customer site). Each private cluster 160 a . . . 160n may be described as a custom cluster.

With embodiments, the public cloud cluster 150 with the cluster management service 120 may be implemented with an Apache® Spark® cluster. With embodiments, e private cluster 160a . . . 160n may be implemented with an Apache® Spark® cluster.

With embodiments, the components of FIG. 1 are part of a cloud computing environment, which includes other components.

Oftentimes, customers may want to leverage the cluster management service 120 to manage a project, a job design, user administration, connection management etc., but for data processing, customers prefer to run on-premise to avoid large data transfer between cloud cluster nodes and on-premise cluster nodes, as well as ensure security, and reduce data exposure by minimizing data transfer between on-premise cluster and the cloud cluster.

Figure 2:
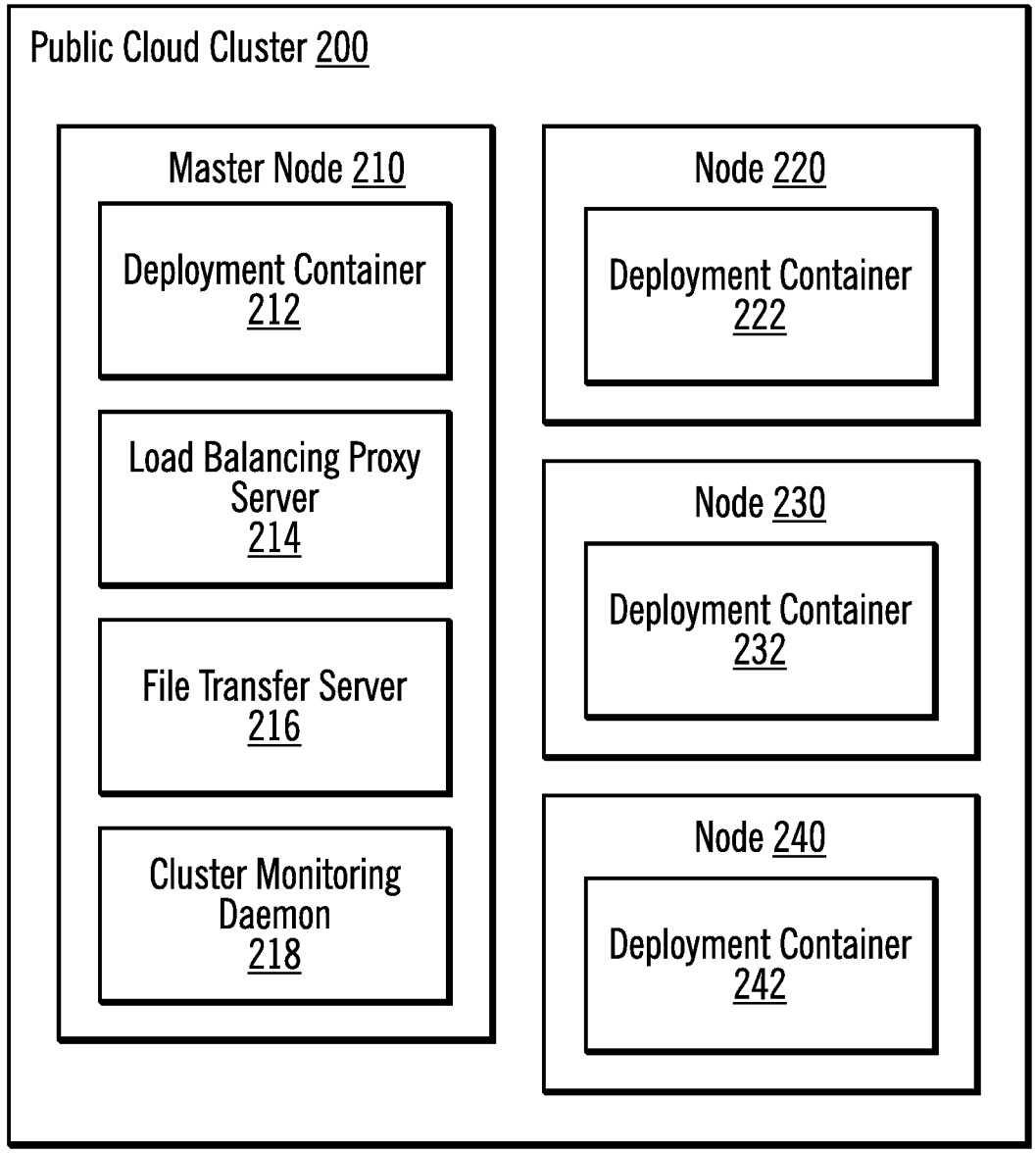
FIG. 2 illustrates, in a block diagram a public cloud cluster in accordance with certain embodiments.

FIG. 2 illustrates, in a block diagram a public cloud cluster 200 in accordance with certain embodiments. The public cloud cluster 150 may be implemented with the components of public cloud cluster 200. The public cloud cluster 200 includes a master node 210 and nodes 220, 230, 240. The master node 210 includes a deployment container 212, a load balancing proxy server 214, a file transfer server 216, and a cluster monitoring daemon 218. Although the load balancing proxy server 214, the file transfer server 216, and the cluster monitoring daemon 218 are illustrated as part of the master node 210, the functionality of the load balancing proxy server 214, the file transfer server 216, and/or the cluster monitoring daemon 218 may be on separate nodes from the master node 210. Any of the nodes in the public cloud cluster 200 may be the master node. Each of the nodes 220, 230, 240 includes a deployment container.

Figure 3:
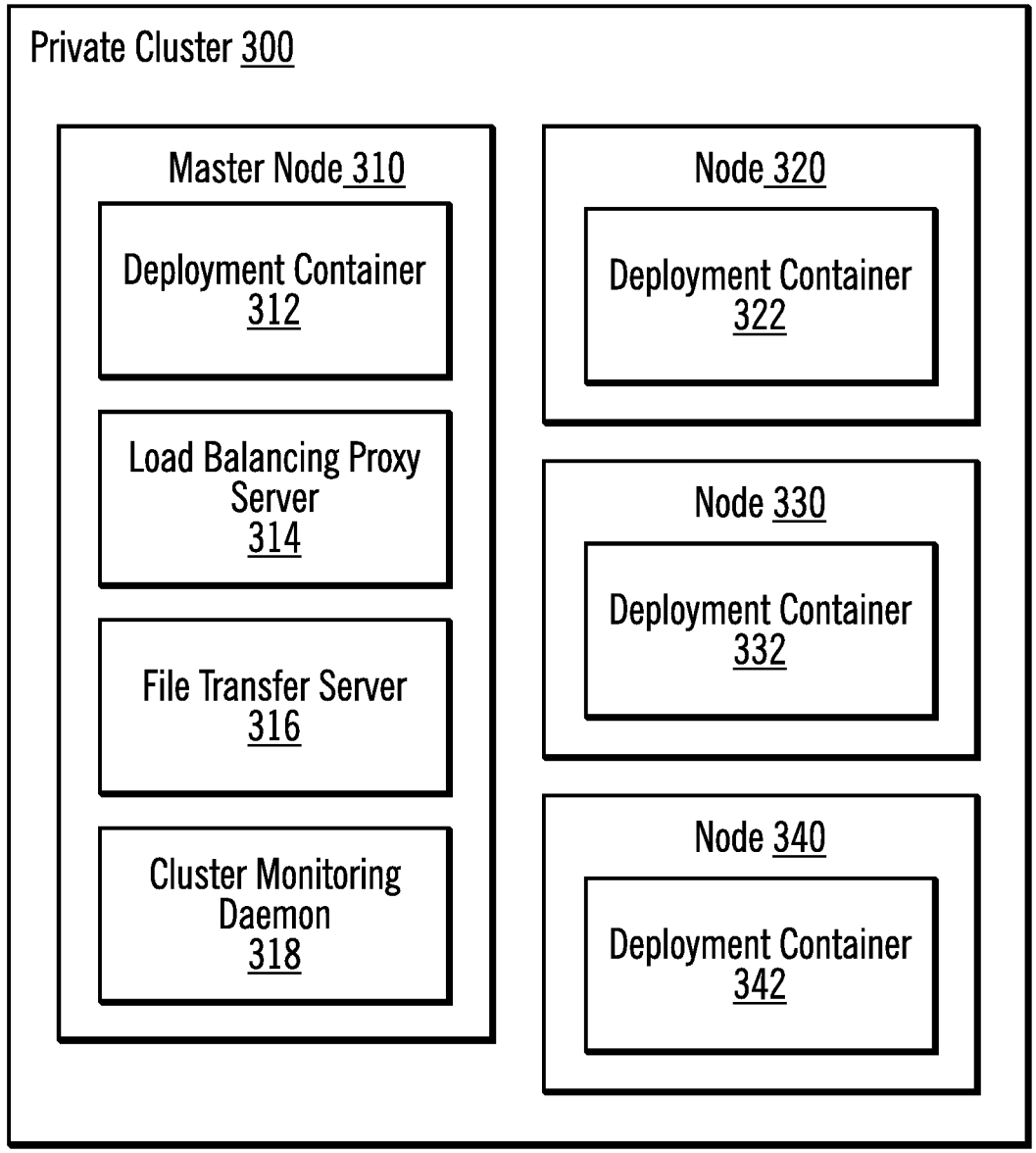
FIG. 3 illustrates, in a block diagram a private cluster in accordance with certain embodiments.

FIG. 3 illustrates, in a block diagram a private cluster 300 in accordance with certain embodiments. The private clusters 160a . . . 160n may be implemented with the components of private cluster 300. The private cluster 300 includes a master node 310 and nodes 320, 330, 340. The master node 310 includes a deployment container 312, a load balancing proxy server 314, a file transfer server 316, and a cluster monitoring daemon 318. Although the load balancing proxy server 314, the file transfer server 316, and the cluster monitoring daemon 318 are illustrated as part of the master node 310, the functionality of the load balancing proxy server 314, the file transfer server 316, and/or the cluster monitoring daemon 318 may be on separate nodes from the master node 310. Any of the nodes in the private cluster 300 may be the master node. Each of the nodes 320, 330, 340 includes a deployment container.

Embodiments propose a hybrid cluster environment 100 to solve security and performance issues related to cloud data services, which are provided by the cluster management service 120. With embodiments, in the hybrid cluster environment 100, there are public cloud clusters managed by a cloud vendor, and there are private clusters run on-premise or in the cloud and co-owned by customers. Embodiments may be used to successfully and efficiently manage various aspects, such as cluster deployment, job runtime, cluster monitoring, etc.

One example of a private cluster is an on-premise cluster at a local (e.g., customer) site. To avoid moving data from the on-premise cluster into a remote public cloud cluster for computation, then moving data back to the on-premise cluster, embodiments set up the on-premise cluster and integrate the on-premise cluster into an extended cluster network supported and managed by the cluster management service 120, which also manages the public cloud cluster.

With embodiments, a customer registers data about a private cluster with the cluster management service 120, which provides cloud data services. The private cluster is used to store that customer's data. This registration data is stored in the customer registration data store 140. The registration data includes a customer identifier, a location of one or more private clusters (such as one or more Uniform Resource Locators (URLs) for private clusters (e.g., one URL for a private cluster and another URL for an on-premise cluster)), and a cluster name for each private cluster. In addition, the registration data includes a file transfer server Internet Protocol (IP) address (i.e., the IP address of the node on which the file transfer server resides), the master node IP address of the private cluster, and may include additional URLs or IP addresses.

With embodiments, the cluster management service 120 manages projects, job designs, scheduling, and administration. A project may be described as a collection of jobs. A job design may be described as a data flow (e.g., for an Extract, Transform, and Load (ETL), for moving data, for sorting data, for removing duplicates from the data, etc.) for a job. Thus, a job may be described as performing data transformation operations. With embodiments, the cluster management service 120 dispatches the jobs (i.e., job runtimes) to private clusters to reduce the management overhead and gain system performance when processing a large dataset in an on-premise cluster or in a private cloud cluster. Deploying the jobs to the private clusters advantageously avoids moving the data from the private clusters to the public cloud clusters and back.

When a customer signs up for the cluster management service 120, the customer may optionally select to register a private cluster by providing the following registration data:
1) A master node URL, such as: XYZ master URL: xyz://host:port
2) Any file transfer server IP address, username/password to transfer the job specification over to the private cluster, as well as retrieve the job status information, job logs back from the private cluster into the cluster management service 120.

With embodiments, the following registration data structure is used to store the registration data for customer identifier, private cluster URL, and file transfer server IP address in the customer registration data store 140:
(1) customer identifier: customer_ID
(2) private cluster URL: xyzURL
(3) file transfer server IP address: user@password:FileTransferServer
(4) notification URL: notificationURL With embodiments, the notification URL is used to notify someone whenever the cluster monitoring daemon 218 detects a critical problem (e.g., service down).

Examples of registration data include:

| (1) | (2) | (3) | (4) |
|---|---|---|---|
| Customer A | xyz://63.26.7.15:6071 | admin/secret:63.26.7.10 | notification_email |
| Customer B | xyz://8.8.8.9:6072 | admin/secret:8.8.8.7 | notification_email |

In certain embodiments, the registration data structure also includes the following registration data:
cluster name: cluster_name
master node IP address: master_IP_address This registration data may be saved into a document (e.g., a JavaScript Object Notation (JSON) document) and stored to the customer registration data store 140. (JavaScript is a registered trademark of Oracle Corporation in the United States and/or other countries.) The registration data may further be associated with the customer as part of the customer context. When the customer logs into the cluster management service 120 through the cluster management UI 110, the customer context is updated to have the registration data for the cluster so that the engine manager 130 may access this registration data when dispatching the job, as well as retrieving the job status information, job logs, and other runtime artifacts.

Figure 4:
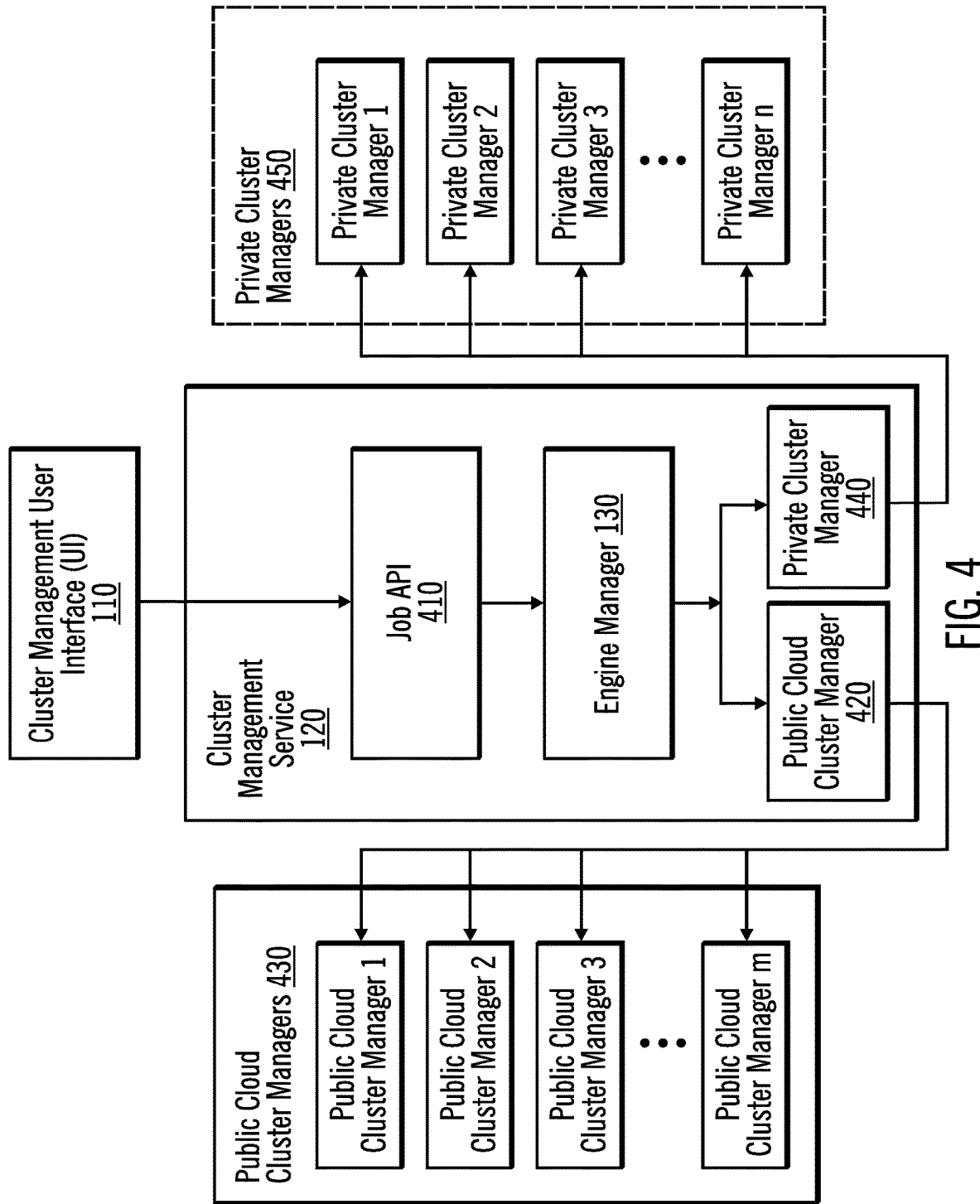
FIG. 4 illustrates, in a block diagram, an architecture of cluster management hosted on extended hybrid clusters from a cluster perspective in accordance with certain embodiments.

FIG. 4 illustrates, in a block diagram an architecture of cluster management hosted on extended hybrid clusters from a cluster perspective in accordance with certain embodiments. In FIG. 4, a cluster management UI 110 is coupled to the cluster management service 120. The cluster management service 120 includes a job API 410, an engine manager 130, a public cloud cluster manager 420 and a private cluster manager 440. The public cloud cluster 420 manages public cloud clusters 430, while the private cluster 440 manages private clusters 450. The public cloud clusters 430 include public cloud cluster 1, public cloud cluster 2, public cloud cluster 3, . . . public cloud cluster m. The private clusters 450 may include any combination of private cloud clusters and on-premise clusters. The private clusters 450 are associated with different customers and include private cluster 1 (e.g., for customer 1), private cluster 2 (e.g., for customer 2), private cluster 3 (e.g., for customer 3), . . . private cluster n (e.g., for customer n). With embodiments, "m" and "n" may be the same or different numbers.

The existing cluster management is hosted on built-in public cloud clusters 430. Embodiments extend the backend to private clusters 450 hosted outside of the public cloud clusters, allowing the customer to 1) design data processing jobs inside the public cloud clusters using sample data and 2) run the data processing jobs to process actual data in private clusters, outside the public cloud clusters.

With embodiments, interactive shaping indicates that all data transformation operations are processed interactively. For example, the user can load some sample data to the cluster management UI 110, select a column of data, perform a sort on the column of data, and see preloaded data that is automatically displayed in the cluster management UI 110 in the sorted order.

With embodiments, a batch process indicates that, after the user has specified all the data transformation operations on the sample data, the user may then save all the data transformation operations into a data flow, and run that data flow against the backend cluster. The result may not be automatically displayed in the cluster management UI 110.

Typically, interactive shaping is used to design a data flow, and batch processing is used to run the data flow against a large volume of data.

With embodiments, the customer registers the private cluster after becoming a public cloud customer. The registration data is stored along with other customer details. Afterwards, the customer may choose from three configuration options to design and run a job:
1) Run both interactive shaping and batch processing inside the public cloud cluster;
2) Run interactive shaping inside the public cloud cluster and batch process either inside the public cloud cluster or outside public cloud cluster (i.e., in the private cluster); or
3) Run both interactive shaping and batch processing outside the public cloud cluster (i.e., in the private cluster).

With embodiments, configuration option 1 is the default configuration. With embodiments, an interactive shaping engine host and the master node are both pre-configured by the cluster management service 120. The interactive shaping engine host may be described as a computer to host an interactive shaping engine With embodiments, configuration option 3 is a one-time configuration when the customer creates an instance of the cluster management service 120. Configuration option 3 sets the interactive shaping engine host and the master node to the Internet Protocol (IP) of one node in the private cluster included in the registration data.

With embodiments, configuration option 2 is directed at job dispatch. When a customer is ready to save and run a designed job, the customer chooses which cluster is to run the job: a public cloud cluster or one of the registered private clusters that the customer is associated with. The list of private clusters that the customer may use may be determined by looking up the registration data in the customer registration data store 140. Each job has a context object, and the customer-specified cluster name may be included as the "clusterName" parameter of the context object of the job. The following is an example context:

```
"context": {
    "clusterName": "AWS",
    "waUrl": "",
    "customerId": "customerUI",
    "orgId": "",
    "userId": "dcuser1",
    "isfSessionId": "b4f07131-1179-4417-9e0a-71e5626eb639",
    "httpSessionId": "",
    "uiHost": "",
    "spaceId": "",
    "serviceType": "DataClick",
    "uiSource": ""
},
```

With embodiments, the job API 410 receives the job from the customer via the cluster management UI 110. Then, the job API 410 forwards the job to the engine manager 130. The engine manager 130 runs (executes) the job and handles status update for the job. With embodiments, the engine manager 130 performs the following operations:

1. Retrieve the cluster name from the job.
2 Use the cluster name to look up the registration data in the customer registration data store 140 to determine the file transfer server IP address and the master node IP address on the public cloud cluster.
3. Construct one or more commands based on the file transfer server IP address and the master node IP address.
4. Run the one or more commands to submit the job run to the private cluster.
5. Collect job run status update that is sent back from the private cluster.
6. Propagate the job run status back to the job API 410.

The following is an example command:
submit_command --name <job_display_name> --class com.xyz.is.drs.engine.batch.driver.Runner file:///opt/XYZ/InformationServer/Server/EngineManager/dependencies/Runner/Engine.j ar -job <job_file> -partitions 4 -status <job_status_file> -jobName <activi-ty_name> -profile <customer_id> -host <master_node_ip> -port 9446 -restUser isadmin - restPassword {iisenc}IpW4p7oXvuo+oOCWagGYlw== -submitTime 2016.09.04.23.19.30.251 -statusUpdater engineManagerRest -updateFrequency 5000 - executor batch -runtimeType compiled A challenge with private clusters is to ensure compatibility with the service tier of the public cloud cluster and binary compatibility with the public cloud cluster. To achieve this consistency and compatibility, a set of self-configuring cluster deployment images and deployment scripts built and maintained by the cluster management service 120 are deployed on the private cluster. The deployment containers store these cluster deployment images and deployment scripts.

The set of cluster deployment images includes a cluster deployment master node image of the master node of the private cluster (stored in the deployment container of the master node of the private container) and a compute node image of each of the other nodes of the private cluster (stored in each of their deployment containers in the private cluster).

With embodiments, each cluster deployment master node image contains a full application server and all dependent cluster management libraries and jar files necessary to support both interactive shaping operations and execution of batch jobs on the private cluster. Additionally, the cluster deployment master node image also contains a file transfer server and a load balancing Hypertext Transfer Protocol (HTTP) proxy server responsible for transferring files to and from the services tier (a set of hosts running in the cloud computing environment responsible for hosting servicing client-side applications and jobs), proxying all incoming connections and providing load balancing support for cluster application engines (which are in deployment containers), the number of which depends on the size of the private cluster and whether the cluster configuration is Symmetric multiprocessing (SMP) (i.e., one node hosting all cluster deployment images) or Massively Parallel Processing (MPP) (i.e., physically separate nodes hosting one or more cluster deployment images).

During cluster deployment startup, the deployment containers execute a configure script (e.g., a configure.sh script) to handle the configuration and startup aspects of the public cloud cluster and cluster management service 120 instance. The configure script is responsible for updating the public cloud cluster environment file (e.g., env.sh), public cloud cluster slave node configuration file, and the application server environment file, as well as, other activities. In the case of the cluster deployment master node image, the configure script also handles the configuration and startup of the load balancing proxy server and file transfer server.

For interactive shaping operations targeted at the private cluster outside of the public cloud cluster, the shaper UI running on the services tier connects to the IP address of the master node of the private cluster on the specified port or a default port, if one is not specified. The load-balancing proxy running on the master node of the private cluster accepts the incoming connection and redirects the request to one of the upstream compute nodes in, for example, a round robin fashion, where the request is handled by the application server.

For batch job execution, a submit script (e.g., a submit.sh script) opens the secure file transfer port on the private cluster's master node and transfers the job from the public cloud cluster to the private cluster. Once the batch job has been transferred to the private cluster, the submit script opens the master port on the private cluster master node to initiate the job run. If the job is successfully started, the driver identifier (ID) associated with the job is returned. The submit script uses the returned driver ID to periodically poll the private cluster master node for the job status information. After the job completes, the submit script opens the secure file transfer port on the private cluster master node and transfers the job status information and job logs (e.g., standard out and standard error logs) back to the services tier. The connections to the private cluster master node made by the submit script are handled by the load balancing proxy server.

To ensure maximum availability of the private cluster, a cluster monitoring daemon (part of the cluster deployment master node image) is used to continuously monitor the quality and health of the private cluster and provide soft recovery where possible. As soon as the cluster monitoring daemon detects an unrecoverable error, the cluster monitoring daemon issues a notification (e.g., to a development operations team via email to investigate and resolve the problem).

The cluster monitoring daemon periodically checks the status of critical services, such as the load balancing proxy server and the file transfer server. If any of the critical services are down, the cluster monitoring daemon attempts to restart the failed service. In addition to services, the new cluster monitoring daemon also checks on the overall health of the private cluster by executing an interactive shaping operation against every interactive shaping engine deployed in the private cluster. If any interactive shaping operation fails more than a pre-determined number of times (e.g., four consecutive times) on a given node, the cluster monitoring daemon marks that node as down in the load balancing proxy server to prevent any new incoming connections from being directed to that down node and a notification is issued (e.g., to the development operations team via email to investigate and resolve the problem). Although a node may be marked as down, the node is still targeted by the cluster monitoring daemon, and, as soon as the node responds successfully to an interactive shaping operation, the cluster monitoring daemon marks the node as up and available and issues a notification (e.g., to the development operations team).

Figure 5:
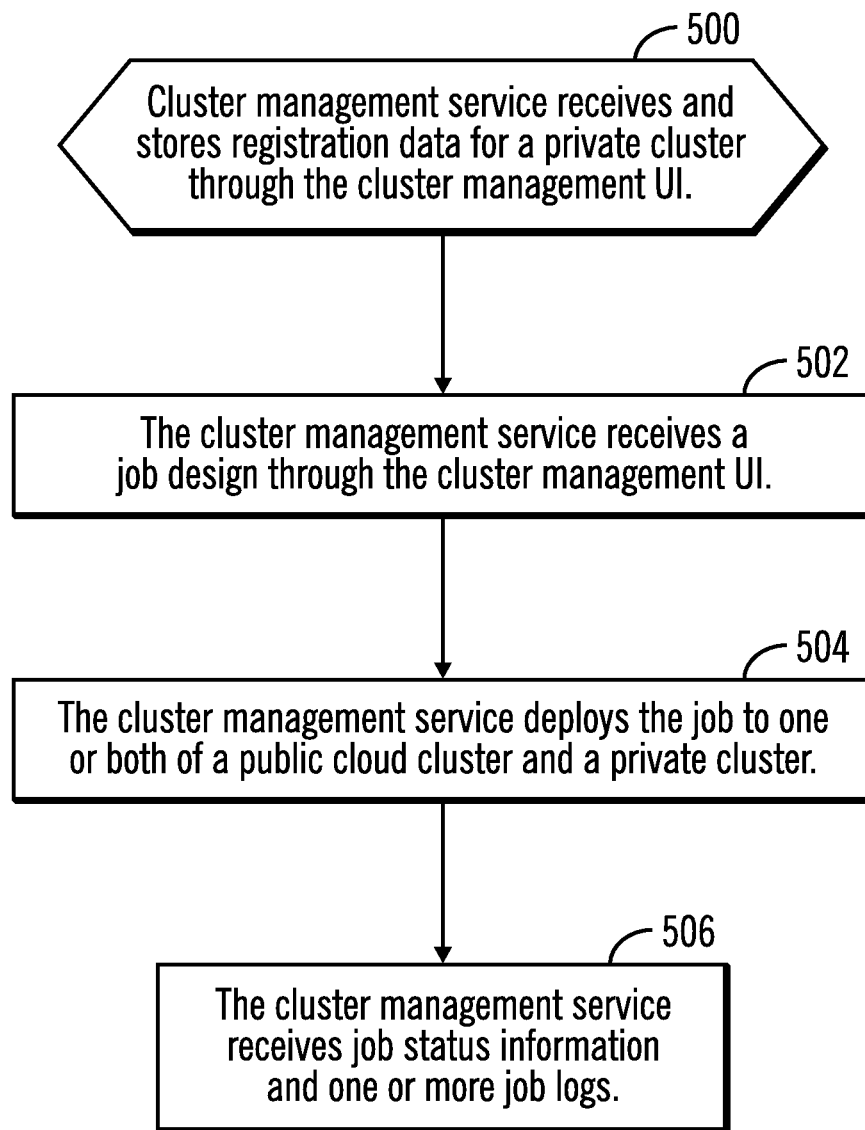
FIG. 5 illustrates, in a flow chart, operations for designing a job in a hybrid cluster environment in accordance with certain embodiments.

FIG. 5 illustrates, in a flow chart, operations for designing a job in a hybrid cluster environment 100 in accordance with certain embodiments. Control begins at block 500 with the cluster management service 120 receiving and storing registration data for a private cluster through the cluster management UI. The registration data is stored in the customer registration data store 140. In block 502, the cluster management service 120 receives a job design through the cluster management UI 110. In block 504, the cluster management service 120 deploys the job to one or both of a public cloud cluster and a private cluster. The customer provides input on whether the job is to be deployed to one or both of the public cloud cluster and the private cluster. With embodiments, the job may also be deployed to multiple private clusters (e.g., a private cloud cluster and an on-premise cluster). In block 506, the cluster management service 120 receives job status information for the status of the job (e.g., finished, finished_with_error, aborted, etc.) and one or more job logs (indicating what actions were performed).

Figure 6:
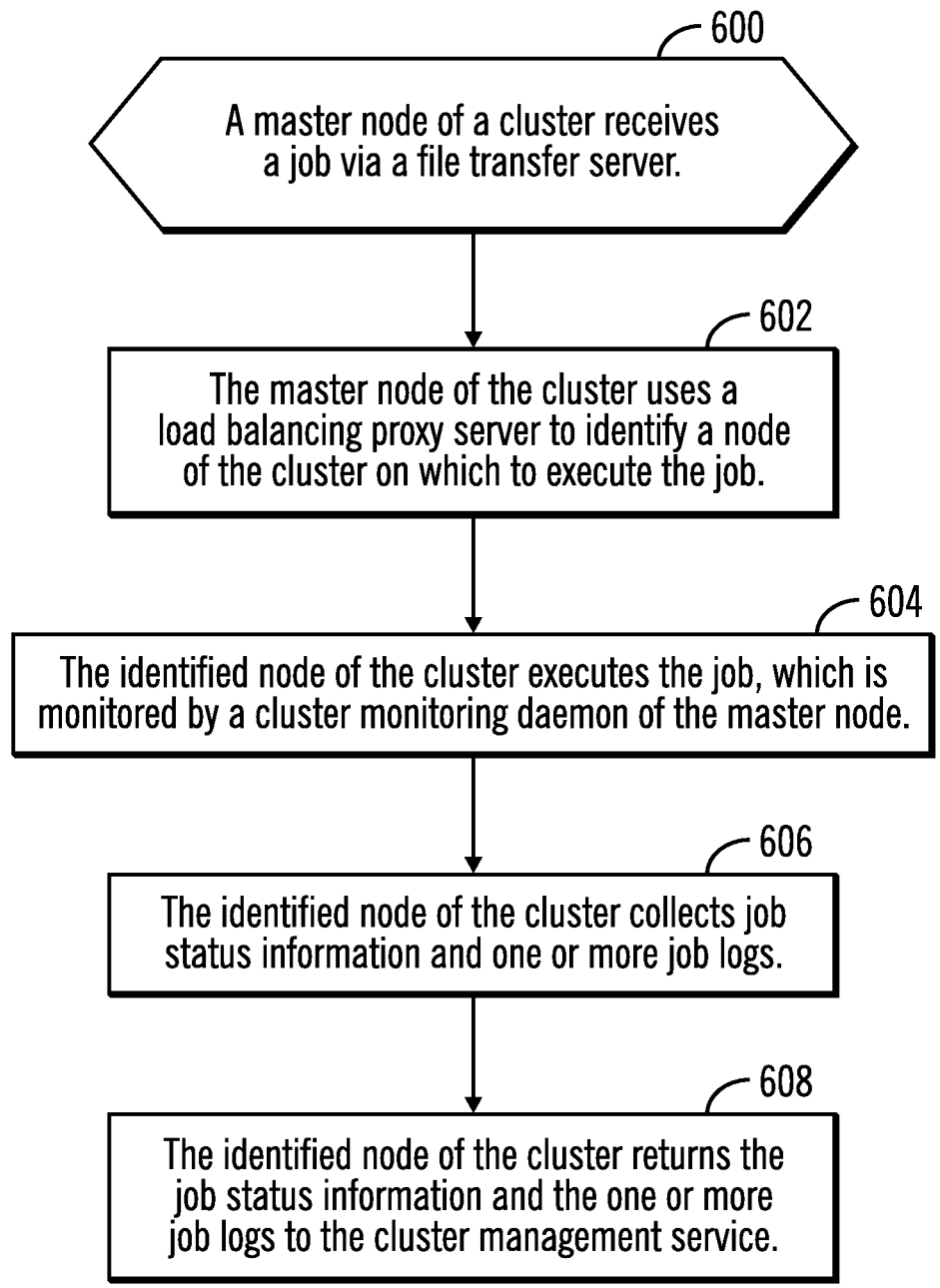
FIG. 6 illustrates, in a flow chart, operations for executing a job in a cluster of a hybrid cluster environment in accordance with certain embodiments.

FIG. 6 illustrates, in a flow chart, operations for executing a job in a cluster of a hybrid cluster environment 100 in accordance with certain embodiments. Control begins at block 600 with a master node of a cluster receiving a job via a file transfer server of that master node. In block 602, the master node of the cluster uses a load balancing proxy server to identify a node of the cluster on which to execute the job. In block 604, the identified node of the cluster executes the job, which is monitored by a cluster monitoring daemon of the master node. In block 606, the identified node of the cluster collects job status information and one or more job logs. In block 608, the identified node of the cluster returns the job status information and the one or more job logs to the cluster management service 120. With other embodiments, the identified node sends the job status information and the one or more job logs to the master node, which returns the job status information and the one or more job logs to the cluster management service 120.

Figure 7A:
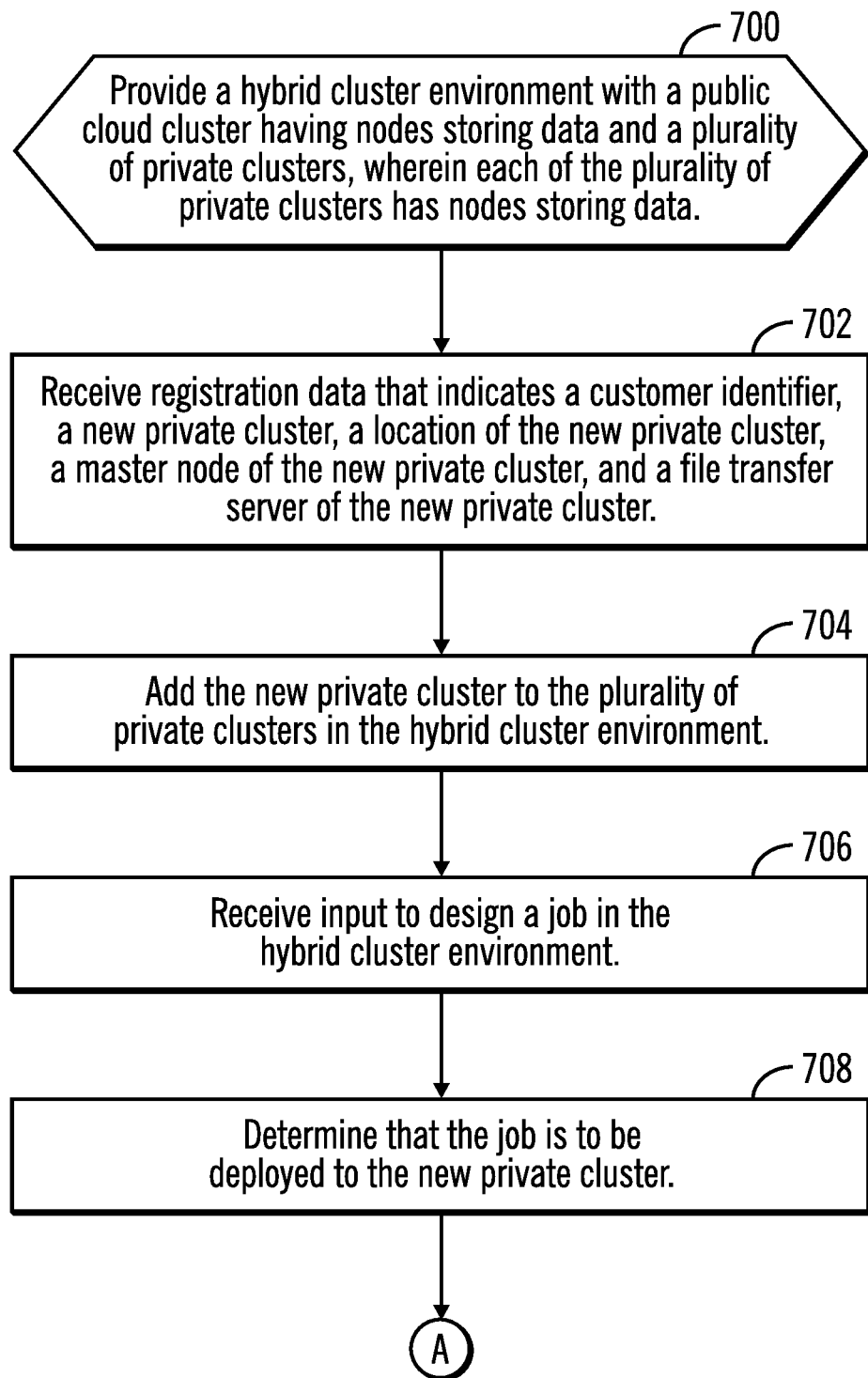
FIGS. 7A and 7B illustrate, in a flow chart, operations for designing and executing a job in a hybrid cluster environment in accordance with certain embodiments.
Figure 7B:
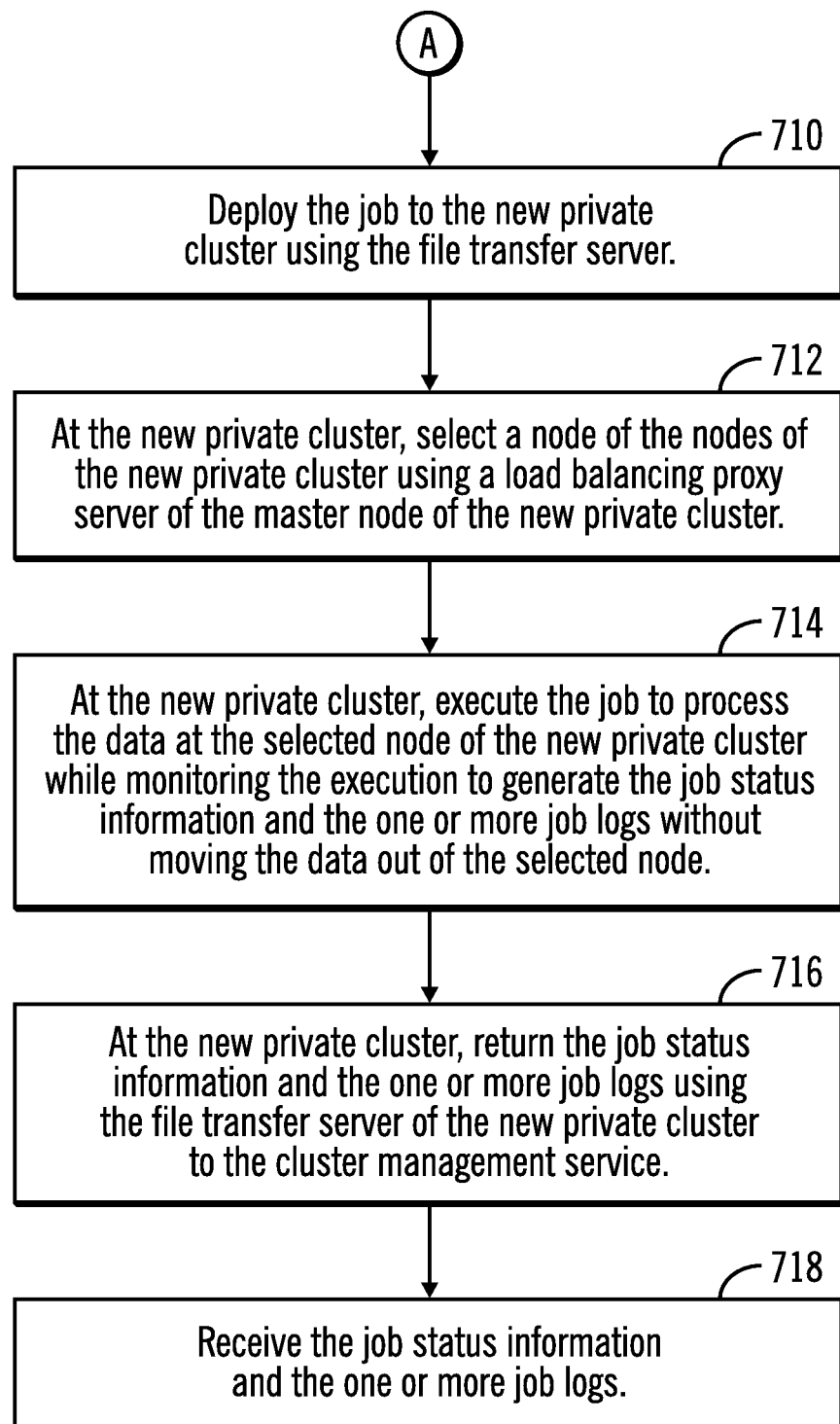

FIGS. 7A and 7B illustrate, in a flow chart, operations for designing and executing a job in a hybrid cluster environment 100 in accordance with certain embodiments. Control begins at block 700 with a hybrid cluster environment 100 being provided, where the hybrid cluster environment 100 includes a public cloud cluster having nodes storing data and a plurality of private clusters, wherein each of the plurality of private clusters has nodes storing data. In block 702, the cluster management service 120 receives, via the cluster management UI 110, registration data that indicates a customer identifier, a new private cluster, a location of the new private cluster (e.g., a URL), a master node of the new private cluster (e.g., with an IP address), and a file transfer server of the new private cluster (e.g., with an IP address). In block 704, the cluster management service 120 adds the new private cluster to the plurality of private clusters in the hybrid cluster environment.

In block 706, the cluster management service 120 receives, via the cluster management UI 110, input to design a job in the hybrid cluster environment 100. The job processes data (e.g., for an Extract, Transform, and Load (ETL), for moving data, for sorting data, for removing duplicates from the data, etc.). Thus, the job is designed in the hybrid cluster environment 100 and may be deployed on any combination of: the public cloud cluster and one or more private clusters. With other embodiments, a job that has already been designed may be selected and run by the same customer on a different cluster. With embodiments, designing the job in the hybrid cluster environment refers to designing the job in a cloud computing environment using the cluster management service 120, rather than on-premise at a customer location, and then the job may be deployed to the on-premise location and executed on-premise.

In block 708, the cluster management service 120 determines that the job is to be deployed to the new private cluster. With embodiments, the cluster management service 120 maps the customer name associated with the job to one or more private clusters using the registration data in the customer registration data store 140, provides a list of the one or more private clusters to the customer via the cluster management UI 110, and receives selection from the customer of any of the private clusters on the list (thus, the customer may select more than one private cluster on which the job is to be executed). With other embodiments, the cluster management service 120 maps the customer name associated with the job to one or more private clusters using the registration data in the customer registration data store 140 and selects one or more of the private clusters based on the type of job. In such embodiments, types of jobs are mapped to particular private clusters using another mapping. From block 708 (FIG. 7A), processing continues to block 710 (FIG. 7B).

In block 710, the cluster management service 120 deploys the job to the new private cluster using the file transfer server identified in the registration information for the new private cluster.

In block 712, a load balancing proxy server of the master node of the new private cluster selects a node of the nodes of the new private cluster to provide load balancing among the nodes. In block 714, the at the selected node of the new private cluster executes the job to process the data at that selected node, while monitoring the execution to generate the job status information and the one or more job logs without moving the data out of the selected node. In block 716, the selected node of the new private cluster returns the job status information and the one or more job logs to the cluster management service 120 using the file transfer server of the new private cluster.

In block 718, the cluster management service 120 receives the job status information and the one or more job logs.

Thus, embodiments support large clusters within a hybrid cluster environment 100. Embodiments enable customers to design jobs in a public cloud cluster and run the jobs either in the public cloud cluster and/or in a private cluster (e.g., on-premise, where data resides) for better security and efficiency.

Embodiments advantageously include: a single design interface via the cluster management UI 110, pluggable runtime clusters, common cluster configuration and management via the cluster management service 120, flexible execution mechanisms, automated cluster deployment using the deployment containers, and automated and dynamic cluster monitoring using the cluster monitoring daemon.

Embodiments improve computer performance and security in a hybrid cluster environment 100 for data integration workloads by avoiding the movement of large amounts of data.

The process of moving large datasets between the public cloud cluster and the private cluster (e.g., an on-premise cluster) may be inefficient and may raise security issues. Embodiments provide a hybrid cluster environment 100 that allows the data to be processed where it resides in order to avoid the efficiency and security concerns of moving the data.

Embodiments configure and manage a hybrid cluster environment 100 for providing secure and efficient data processing services, such as data preparation, interactive shaping, transformation and cleansing.

Embodiments focus on large hybrid cluster management, from registration, deployment, monitoring, to job execution. Embodiments support flexible execution models, as well as, mechanisms for cluster registration, deployment, and monitoring.

Embodiments allow the customer to design and test dataflow in the public cloud cluster and process actual data in the private cluster (e.g., in an on-premise cluster) without moving data around. The private cluster (e.g., the on-premise cluster) environment becomes part of the extended public cloud cluster, and any configuration, deployment, maintenance, and monitoring are handled automatically by the public cloud cluster.

With embodiments, once the customer registers the private cluster (e.g., the on-premise cluster) with the cluster management service 120, the customer then has multiple configuration options to process the data cluster either within the public cloud cluster and/or the private cluster (e.g., the on-premise cluster). The ability of the customer to perform jobs on data either on-premise, in a private cloud cluster or in the public cloud cluster advantageously improves processing efficiency and data security. Thus, with embodiments, the customer registers the private cluster information with the cluster management service 120 to manage projects, job designs, scheduling and administration, and dispatch the job runtimes to private clusters for reducing the management overhead and gaining system performance while processing large dataset on-premise Embodiments also provide a single design interface for both private clusters and public cloud clusters, as well as, automated deployment and monitoring functions.

Embodiments provide hybrid cluster configuration to flexibly manage both the public cloud cluster and the private cloud cluster of customers for providing secure and efficient data processing services, where the hybrid clusters may be managed by a cloud vendor and also co-owned by customers.

Embodiments make the cluster management service 120 available on-premise so the customer can design data integration applications in the public cloud cluster, but run the job either on the public cloud cluster and/or the private cloud cluster. The cluster management service 120 provided by embodiments not only covers the processing resources, but also the service enablement, deployment, monitoring, and upgrade.

Figure 8:
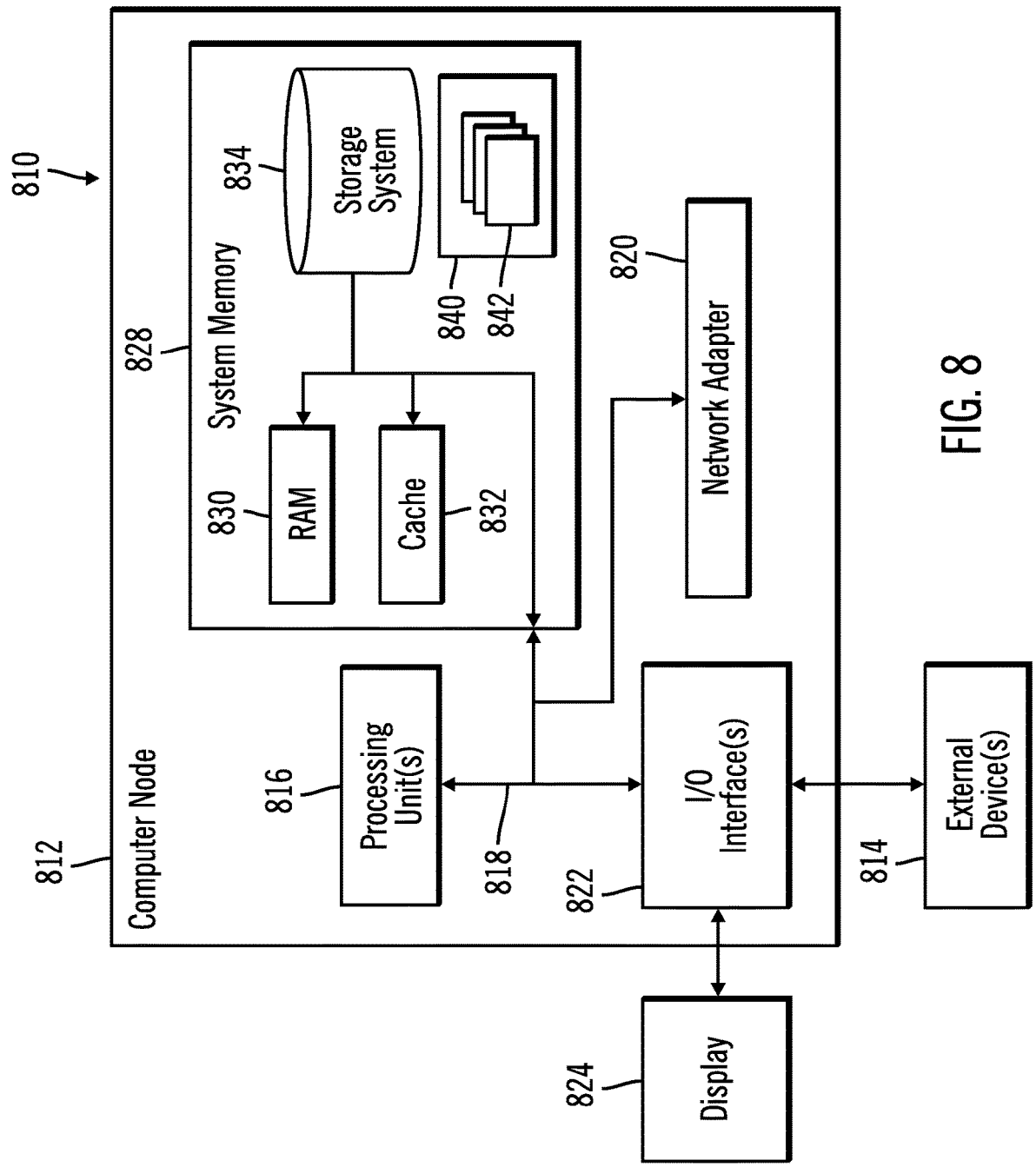
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the cluster management service 120 and the nodes of the clusters each have the architecture of computer node 812. In certain embodiments, the components of FIGS. 1 and 2 are part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-customer model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premise or off-premises.

Community cloud: the cloud infrastructure is shared by several organizations and supports a specific community that has shared concerns (e.g., mission, security requirements, policy, and compliance considerations). It may be managed by the organizations or a third party and may exist on-premise or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
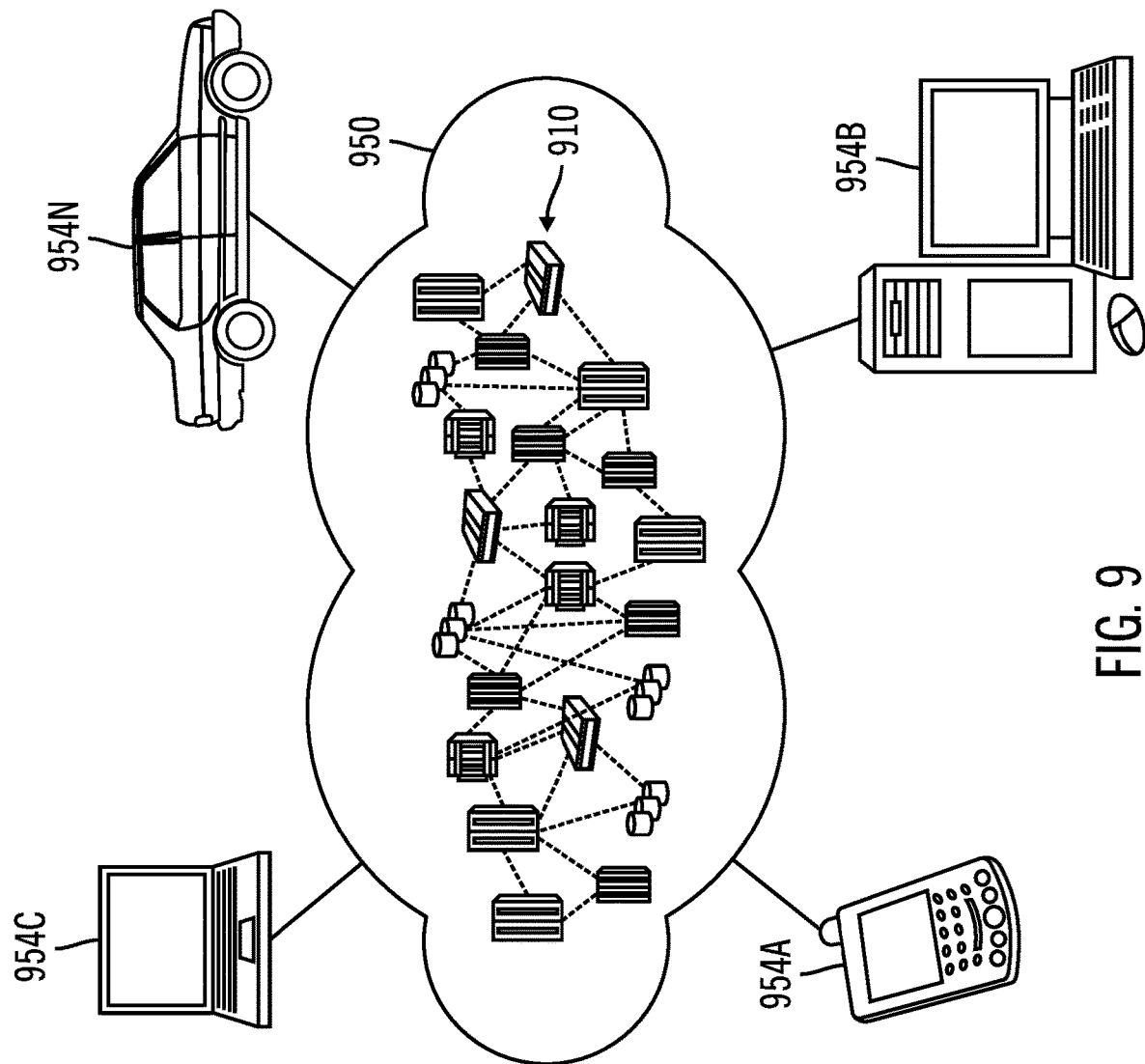
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
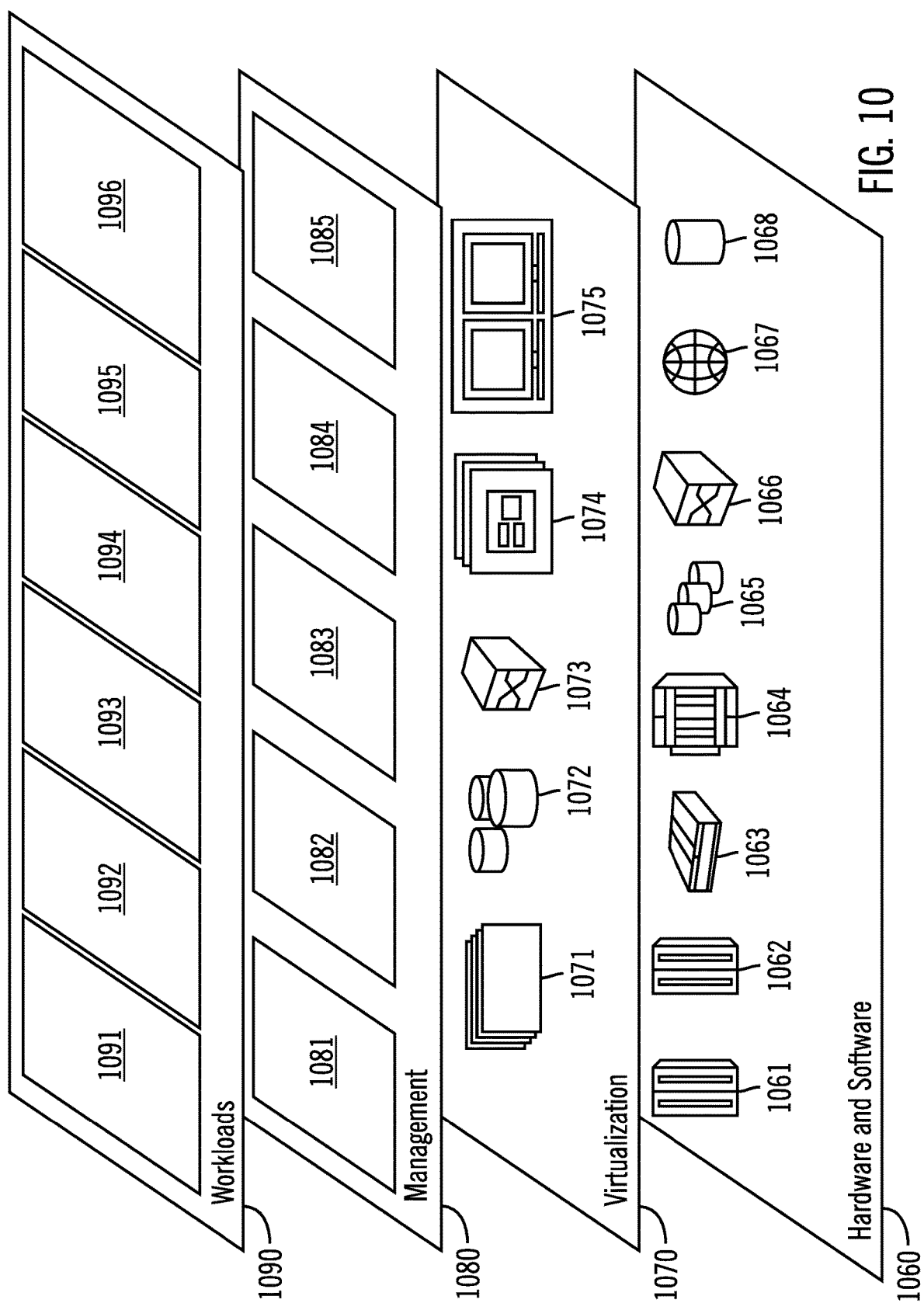
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and data processing in a hybrid cluster environment 1096.

Thus, in certain embodiments, software or a program, implementing d data processing in a hybrid cluster environment in accordance with embodiments described herein, is provided as a service in a cloud computing environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    providing a hybrid cluster environment with a public cloud cluster having nodes storing data and a plurality of private clusters, wherein each of the plurality of private clusters has nodes storing data;
    receiving registration data that indicates a customer identifier, a new private cluster, and a file transfer server;
    adding the new private cluster to the plurality of private clusters in the hybrid cluster environment;
    receiving input to design a job to process data in the hybrid cluster environment;
    determining that the job is to be deployed to the new private cluster;
    deploying the job to the new private cluster using the file transfer server, wherein the job is executed at the new private cluster; and
    receiving job status information and one or more job logs with the file transfer server.

2. The computer-implemented method of claim 1, wherein the job is deployed at any combination of: the public cloud cluster and any cluster from the plurality of private clusters.

3. The computer-implemented method of claim 1, wherein the registration data identifies a master node of the new private cluster.

4. The computer-implemented method of claim 3, further comprising operations for:
    selecting a node of the nodes of the new private cluster using a load balancing proxy server of the master node of the new private cluster;
    executing the job to process the data at the selected node of the new private cluster while monitoring the execution to generate the job status information and the one or more job logs without moving the data out of the selected node; and
    returning the job status information and the one or more job logs using the file transfer server of the new private cluster.

5. The computer-implemented method of claim 1, wherein a cluster management service of the hybrid cluster environment creates the job based on the input to design the job.

6. The computer-implemented method of claim 1, wherein the new private cluster is one of an on-premise cluster at a customer location and a private cloud cluster.

7. The computer-implemented method of claim 1, wherein a Software as a Service (SaaS) is configured to perform the operations of the method.

\* \* \* \* \*